United States Patent [19]

Andrejasich et al.

[11] Patent Number: 4,721,950
[45] Date of Patent: Jan. 26, 1988

[54] FLUID DETECTOR

[75] Inventors: Raymond J. Andrejasich, Carmel; Roy F. Kidd, Clayton; Ford C. Jefferson, Beech Grove, all of Ind.

[73] Assignee: Emhart Industries, Inc., Indianapolis, Ind.

[21] Appl. No.: 944,587

[22] Filed: Dec. 22, 1986

[51] Int. Cl.⁴ ............................................. G08B 21/00
[52] U.S. Cl. .................................... 340/603; 340/605; 73/49.2; 73/61.1 R
[58] Field of Search ............... 340/605, 603, 328, 329; 73/61.1 R, 40.5 R

[56] References Cited

U.S. PATENT DOCUMENTS

| | | | |
|---|---|---|---|
| 3,693,110 | 9/1972 | Briggs, Jr. et al. | 340/328 |
| 3,978,468 | 8/1976 | Bond et al. | 340/603 |
| 4,088,985 | 5/1978 | Saito et al. | 340/605 |
| 4,090,193 | 5/1978 | Hinkle, Jr. | 340/605 |
| 4,580,033 | 4/1986 | Andrejasich | 73/49.2 |
| 4,644,354 | 2/1987 | Kidd | 340/605 |
| 4,646,069 | 2/1987 | Andrejasich et al. | 340/603 |

Primary Examiner—Stewart J. Levy
Assistant Examiner—Hezron E. Williams
Attorney, Agent, or Firm—Carl A. Forest

[57] ABSTRACT

There is a plurality of probes electrically connected to a central controller. Each of the probes is capable of providing a hydrocarbon signal, a water signal and a dry signal upon sensing these respective environments. The controller includes an audible alarm transducer and a switch for activating circuitry providing either a first alarm mode which provides an alarm in response to a hydrocarbon signal or a second alarm mode which provides an alarm in response to a hydrocarbon signal and also a water signal. A continuous alarm tone is provided upon receiving a hydrocarbon signal while an intermittent alarm tone is provided upon receiving a water signal. A yellow label links a "water" sign and the transducer and a red label links an "oil" sign and the transducer. The yellow label encircles only a small portion of the transducer and the red label encircles the major portion of the transducer so as to provide a visual indication that the shorter, intermittent tone indicates water while the longer, continuous tone indicates hydrocarbon.

6 Claims, 4 Drawing Figures

FLUID DETECTOR

BACKGROUND OF THE INVENTION

1. Field of the Invention

The present invention in general relates to fluid detectors and more particularly to such detectors that can differentiate between the presence of hydrocarbons, water, and the dry condition.

2. Description of the Prior Art

The contamination of ground water by hydrocarbon leaking from underground tanks has become a serious problem in recent years, particularly since tanks installed during a gasoline station boom that occurred many years ago are now becoming aged and increasingly subject to leaks. When an underground hydrocarbon storage tank leaks, not only is groundwater contaminated but the party responsible must often pay substantial costs for clean-up. Thus it is essential that leaks be detected as soon as possible. For these reasons, leak detectors that can monitor the environment in the vicinity of a tank and can differentiate between hydrocarbon, water and the dry condition and provide an alarm on the detection of hydrocarbon have been developed. See, for example, U.S. Pat. No. 4,586,033 issued to Raymond J. Andrejasich. Other such detectors have provided a programmable relay which can be set to be activated upon any combination of dry, hydrocarbon, or water. See U.S. Pat. No. 4,644,354 issued to Roy E. Kidd. This flexibility is useful because sensing probes may be placed outside a tank, where they normally encounter water and thus it is desirable to alarm only in response to hydrocarbon, or between the inner and outer tanks of a double-walled tank where they are normally dry and thus it is desirable to alarm on either hydrocarbon or water. In all of the above systems, the audible alarm provided is the same for any condition for which it is programmed to be activated.

SUMMARY OF THE INVENTION

It is an object of the invention to provide a fluid detector that can be easily adapted for use either with probes external of a tank or with probes between the walls of a double-walled tank.

It is another object of the invention to provide a fluid detector which provides an audible alarm upon detection of hydrocarbon and a second, different, audible alarm upon the detection of water.

It is a further object of the invention to provide the above object in a fluid detector that also provides a visual indication that the first alarm indicates hydrocarbon and the second alarm indicates water.

Yet another object of the invention is to provide the above objects in a detector which is inexpensive to manufacture.

The invention provides a fluid detector of the type comprising a plurality of probe means for sensing their fluid environment and for providing a hydrocarbon signal indicative of the presence of hydrocarbon in the probe environment, a water signal indicative of the presence of water in the probe environment, and a dry signal indicative that the probe environment is dry, and a controller means responsive to the probe signals for providing an alarm, and wherein the controller means includes: a means for selecting between a first alarm mode in which an alarm is provided only in response to a hydrocarbon signal from one or more of the probes and a second alarm mode in which an alarm is provided both in response to a hydrocarbon signal from one or more of the probes and also to a water signal from one or more of the probes; and means for providing a first audible alarm in response to a hydrocarbon signal and a second audible alarm in response to a water signal. Preferably, the controller also includes an audible alarm transducer and a control panel with said alarm transducer mounted in said panel, and further includes a visual means for visually indicating that the first audible alarm indicates hydrocarbon and the second audible alarm indicates water. Preferably the first audible alarm is a continuous tone and the second audible alarm is an intermittent tone and the visual means comprises a first label and a first outline in a first color, the first label visually linking the first label and the transducer, and a second label and a second outline in a second color, the second label visually linking the second label and the transducer, and wherein the first and second outlines at least partially encircle the transducer with the first outline encircling a larger portion of the transducer than the second outline.

The fluid detector according to the invention is more versatile than the prior detectors in that it permits a single relatively simple controller to be used in combination with either a system in which the probes are mounted in wells outside the tank or a system in which the probes are mounted between the walls of a double-walled tank. In the latter case, it also distinguishes between leaks of the inner tank, which will produce the first alarm and leaks of the outer tank, which will produce the second alarm. Numerous other features, objects and advantages of the invention will become apparent from the following detailed description when read in conjunction with the accompanying drawings.

DESCRIPTION OF THE PREFERRED EMBODIMENT

Figure 1:
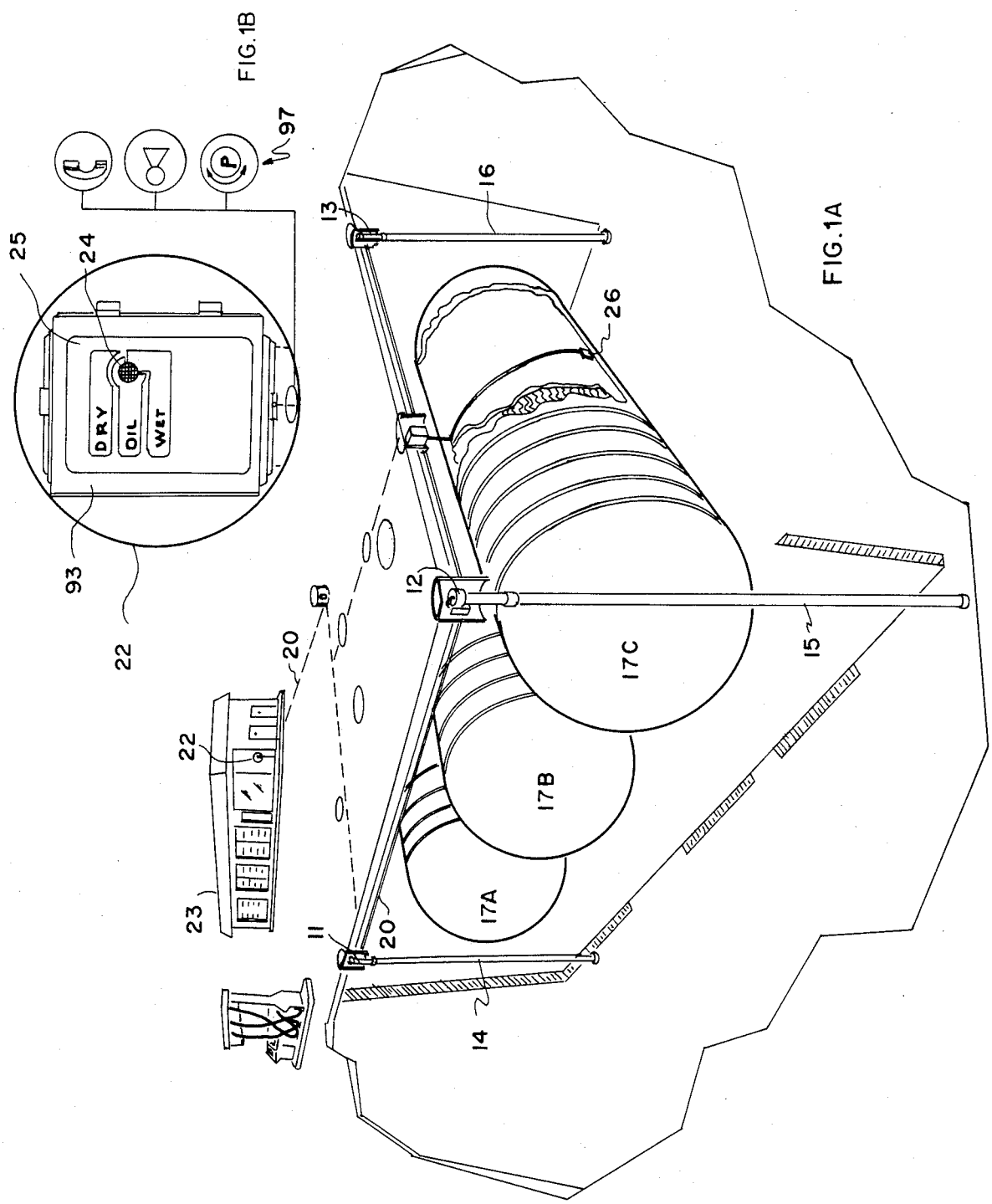
FIG. 1A is a partially cut away illustration showing a fluid detection system according to the invention installed at a gasoline station.
FIG. 1B shows an enlarged view of the controller 22 of FIG. 1A.

FIG. 1 illustrates the preferred embodiment of the invention as it may be installed at a gasoline station. A plurality of probe means 11, 12 and 13 are installed in wells 14, 15 and 16 respectively in the vicinity of gasoline tanks 17A, 17B and 17C. Each of probes 11, 12 and 13 sense their fluid environment and provide signals over cable 20 to a control means 22 which would generally be located in the service building 23. Control means 22 includes an alarm transducer 24 mounted on front panel 25. In another embodiment, the probe means may comprise probes, such as 26 which are installed between the walls of a double walled tank such as 17C. The controller 22 includes a means 27 (FIG. 2) for selecting between a first alarm mode in which an alarm is provided only in response to a hydrocarbon signal from one or more of the probes and a second alarm mode in which the alarm is provided in response to a hydrocarbon signal from one or more of the probes and also to a water signal from one or more of the probes. The first alarm mode would be selected in an installation using outside the tank probes 14, 15 and 16 while the second alarm mode would be selected in an installation using between the tank wall probes such as 26. Outside the tank probes 14, 15 and 16 may be probes such as described in U.S. Pat. No. 4,586,033 referred to above and incorporated hereby reference. In tank probes, such as 26, may be probes as described in U.S. patent application Ser. No. 06/846,122 which is incorporated herein by reference.

Figure 2:
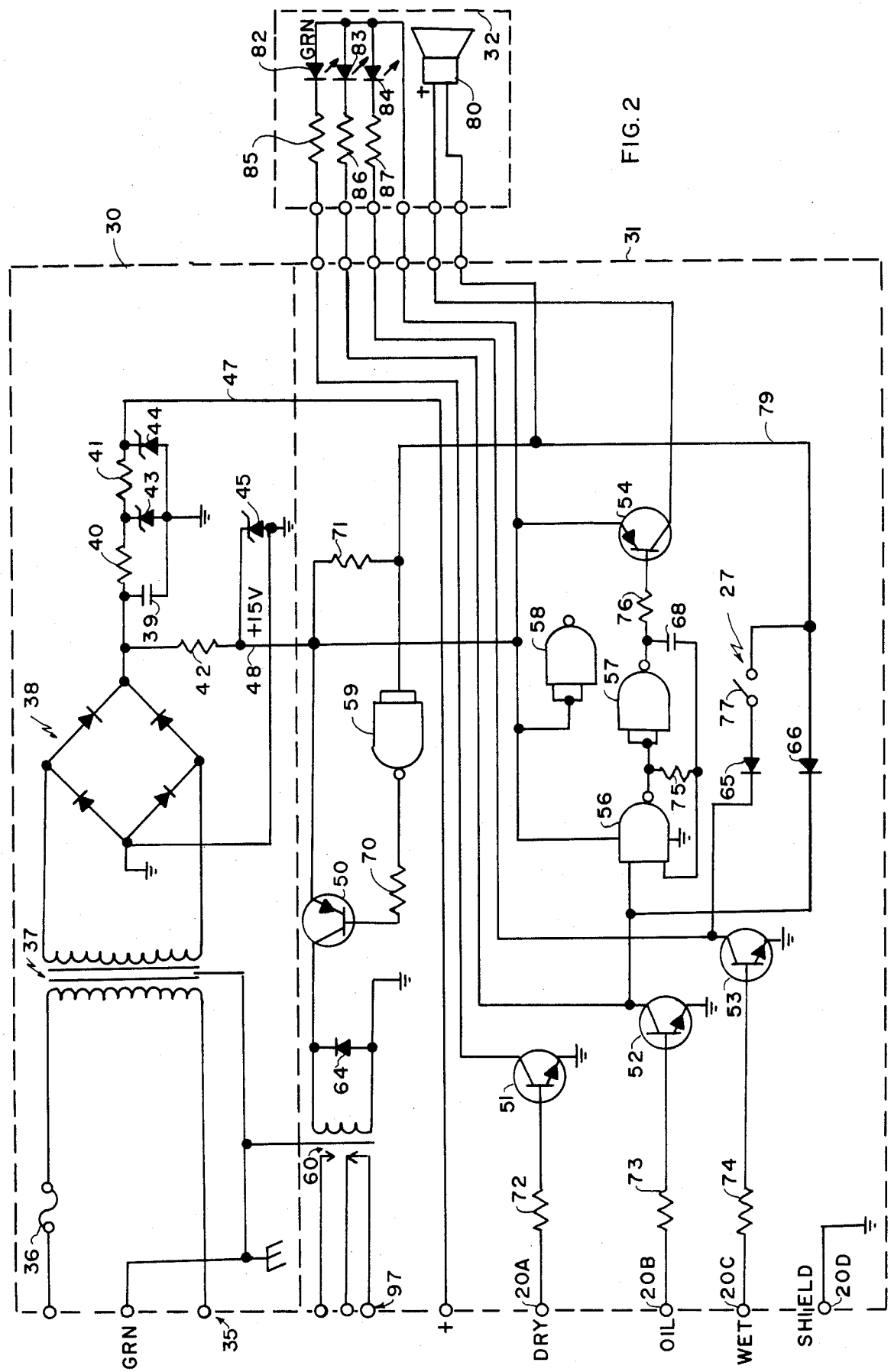
FIG. 2 is a detailed electrical circuit diagram of the controller according to the preferred embodiment of the invention.

Turning now to FIG. 2, a detailed electrical circuit diagram of the preferred controller 22 according to the invention is shown. The circuit diagram may be divided into three sections: power supply 30, control circuitry 31, and alarm output circuitry 32.

Power supply 30 includes three input terminal blocks 35, fuse 36, transformer 37, full-wave bridge rectifier 38 (made up of four diodes), capacitor 39, resistors 40, 41 and 42, and Zener diodes 43, 44 and 45. One side of fuse 36 is connected to one of the 110 V AC inputs 35 and the other is connected to one side of the primary of transformer 37. The other side of the primary is connected to the other 110 V AC input. The core of transformer 37 is connected to the ground terminal of the AC plug which is also connected to the system ground. The secondary of transformer 37 is connected across the inputs of bridge rectifier 38. The low output of rectifier 38 is connected to DC ground and to the anode of Zener diode 45. The cathode of Zener diode 45 is connected to the high side of rectifier 38 through resistor 42. The high side of rectifier 38 also provides a 15 volt positive voltage supply for the probes on line 47 through current limiting resistors 40 and 41. The line between resistors 40 and 41 is connected to ground through Zener diode 43 with the anode of the diode towards DC ground. The high side of rectifier 38 also is connected to the anode of Zener diodes 43 and 44 through capacitor 39. The cathode of Zener diode 44 is connected to the 15 volts positive probe voltage line 47. Zener diode 45 and resistor 42 provides a separate +15 V regulated output power source on line 48 for the control unit 31 and the alarm output circuit 32.

Control circuit 31 comprises PNP transistors 50 and 54, NPN transistors 51, 52 and 53, NAND gates 56 through 59, relay 60, diodes 64 through 66, capacitor 68, resistors 70 through 76 and switch 77. The bases of transistors 51, 52 and 53 are connected to the dry, oil and wet inputs 20A, 20B and 20C respectively (from the probes) through resistors 72, 73 and 74 respectively. The emitter of each transistor 51, 52 and 53 is connected to DC ground. The NAND gates 56 through 59 are in a Quad NAND gate integrated circuit package. The collector of transistor 52 is connected to one input of NAND gate 56 and to the cathode of diode 66. The other input of gate 56 is connected to its output through resistor 75 and to the output of NAND gate 57 through capacitor 68. The output of gate 56 is also connected to both inputs of gate 57. The output of gate 57 is also connected to the base of transistor 54 through resistor 76. The emitter of transistor 54 is connected to the +15 V power line. The +15 V power line is also applied to the power input pin of the Quad NAND IC (shown on gate 56) and to both inputs of gate 58. The ground terminal of the Quad NAND IC (shown on gate 56) is grounded. The anode of diode 66 is connected via line 79 to both inputs of NAND gate 59 and to the +15 V power line 48 through resistor 71. The anode of diode 65 is connected to one side of switch 77. The other side of switch 77 is connected to line 79 also. The output of NAND gate 59 is connected to the base of transistor 50 through resistor 70. The emitter of transistor 50 is connected to the +15 V power line 48 and its collector is connected to one side of the coil of relay 60. The other side of the coil of relay 60 is connected to ground. Diode 64 is connected across the inputs of the coil of relay 60 with the anode of the diode toward the grounded side. The shield input 20D from the probes is connected to DC ground.

The alarm output circuitry comprises SONALERT ™ alarm module 80, LED's 82, 83 and 84, and resistors 85, 86 and 87. The negative terminal of alarm module 80 is connected to line 79 and the positive terminal to the collector of transistor 54. The anodes of LED's 82, 83 and 84 are connected to the +15 V power line 48 and their cathodes are connected to the collectors of transistors 51, 52 and 53 respectively.

Figure 3:
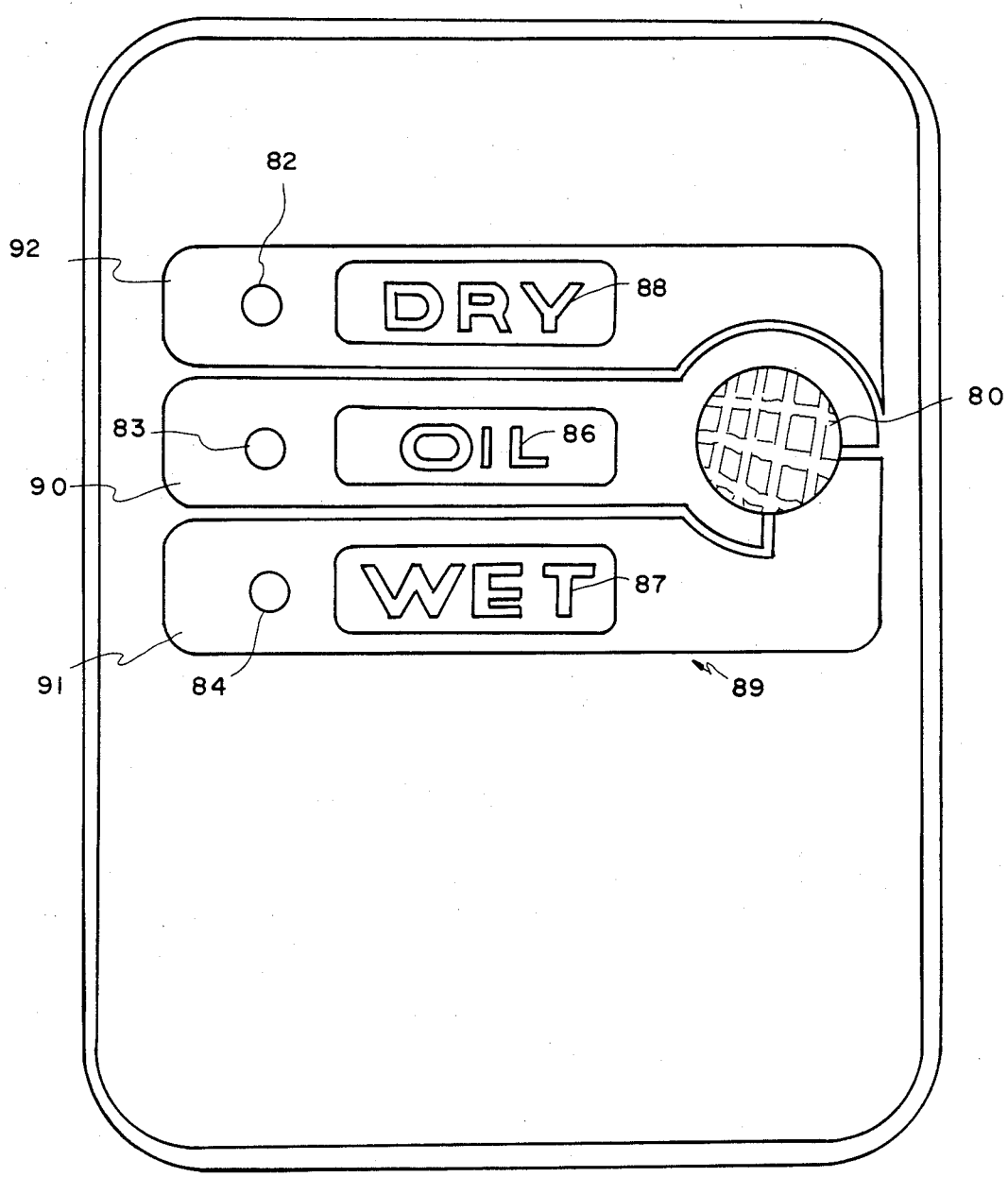
FIG. 3 is an illustration of the preferred controller control panel according to the invention.

A preferred embodiment of the front panel 25 of the controller 22 is shown in FIG. 3. The alarm transducer module 80 is mounted on the panel. The panel also includes a visual means 89. Visual means 89 includes a first label 86 indicating "oil" (hydrocarbon), a second label 87 indicating "wet" (water), and a third label 88 indicating "dry" (i.e. absence of liquid). There is also a first outline 90 which visually links the oil label 86 and transducer 80, and a second outline 91 which links the wet label 87 and the transducer 80. The first outline 90 encircles the major portion (preferably about ¾ of the circumference) of the transducer 80 and the second outline 91 encircles a smaller portion (preferably about ¼ of the circumference) of the transducer. The dry label outline 92 does not provide a visual link to the transducer. Preferably the first label 86 and outline 90 are of a highly visible color suggesting urgency, such as red, and the second label 87 and outline 91 are of a lesser visible color suggesting a lesser emergency, such as yellow, and the third label 88 and outline 92 are of a color, such as green, which suggests normal operating conditions. The LED's 82, 83 and 84 are also mounted on the front panel 25; LED 83 is preferably red and is surrounded by the red outline 90, LED 84 is preferably yellow and is surrounded by the yellow outline 91, while the LED 82 is preferably green and surrounded by the green outline 92.

The controller circuitry of FIG. 2 is preferably housed in a metal or plastic case 93 (FIG. 1) and the labels and outlines are silk screened on a sheet of plasticized fabric with an adhesive back for applying it to the case 93. The electronic parts are preferably as follows: fuse 36 is a 16 amp slo-blo fuse, transformer 37 is an 8 to 1 transformer, the diodes of rectifier 38 are type IN4001, diode 64 is also a type IN4001, Zener diodes 43, 44 and 45 are type IN5352, diodes 65 and 66 are type IN914, relay 60 is a double-pole double-throw such as the MAGNEGRAFT ™ 76 series, transistors 50 and 54 are type PN2907, transistors 51, 52, and 53 are type PN2222, the Quad NAND IC is a type 4011, capacitors 39 and 68 are 1000 millifarads and 0.22 microfarads respectively, resistors 40 and 42 are 30 ohm, resistor 41 is 15 ohm, resistors 70, 71, 72, 73, 74 and 76 are 10K ohm, resistor 75 is 2.2 meg ohm, and resistors 85, 86 and 87 are 1K ohm; the alarm transducer 80 is preferably a SONALERT ™ alarm module (available from Mallory Components Group, 3029 East Washington Street, Indianapolis, Indiana) which includes its own oscillator circuit.

The preferred embodiment of the invention operates as follows.

The inputs 20A, 20B and 20C (FIG. 2) are connected to the probes, such as 11, 12, 13 (FIG. 1) in one embodiment, and 26 in another embodiment, through cable 20. In a normally dry environment, the probes will normally detect a dry condition and an approximately 12 V "Dry" probe signal will be input on input 20A. This signal wil turn on transistor 51 allowing current to flow through resistor 85 and LED 82, turning on the green LED 82.

When hydrocarbon is detected by any of the probes, an approximately 12 V hydrocarbon signal will be input on input 20B. This signal will turn on transistor 52 which will turn on red LED 83 and will also place a logic low signal on one input of gate 56 and the cathode of diode 66. The low signal on the input of gate 56 latches its output high. This high is applied to the inputs of gate 57 which will drive its output low, which low signal turns on PNP transistor 54, which provides a positive voltage to the alarm module 80. The negative side of alarm module 80 is tied to ground through diode 66 and transistor 52, turning on the alarm continuously. Transistor 52 and diode 66 also apply a low to both inputs of gate 59 which will drive its output high, which will turn off transistor 50 de-energizing relay 60.

When water is detected by any of the probes connected to cable 20, an approximately 12 V water signal will be input on input 20C. This signal will turn on transistor 53 and yellow LED 84. If "oil" input 20B is not activated, there will be a high at one input of gate 56 making the gate an inverter of whatever signal is on the other input. This makes gate 56 and gate 57 a two gate oscillator which turns transistor 54 on an off at the oscillation frequency determined by resistor 75 and capacitor 68, providing a pulsating voltage on the positive input of alarm module 80. If switch 77 is closed to select an alarm on oil and water, the negative side of alarm module 80 will be pulled low through diode 65 and transistor 53 causing the alarm 80 to pulse, producing an intermittent audible alarm. The low through diode 65 will also be applied to both inputs of gate 59, de-energizing the relay as discussed above. If switch 77 is open, the high on the input of gate 56 will also be applied through diode 66 to the negative side of alarm module 80, which will result in no audible alarm being provided in response to a water signal.

When neither an oil or wet probe signal is being received the transistors 52 and 53 will remain off and a high signal will be applied to the inputs of gate 59 which will cause its output to be low turning on PNP transistor 50. This will hold the relay energized. Upon a power failure, the relay will de-energize providing a relay closure upon power failure. The closure of relay 60 may trigger a telephone recorder, an alarm, or turn on some other power source as indicated at 97 in FIG. 1 to provide an external alarm output.

From the above, it can be seen that when switch 77 is open an alarm on transducer 80 and on the external outputs 97 will be activated in the presence of hydrocarbon only, which is the first alarm mode. When switch 77 is closed an alarm on transducer 80 and external outputs 97 will be activated in the presence of hydrocarbon and also in the presence of water, which is alarm mode 2. In both modes, an external alarm on outputs 97 will be provided on power failure. The invention thus lends itself for use both with probes in wells outside the tanks 17A through 17C and with probes between the walls of the tanks. In the former case, switch 77 should be placed in the alarm mode 1 (open) position and in the latter case, it should be placed in the alarm mode 2 (closed) position. In mode 2, the detector system will produce a continuous alarm in the presence of oil, thus indicating a leak in the inner tank, and an intermittent alarm in the presence of water, indicating a leak in the outer tank. The sounding of an alarm will draw the attention of an attendant to the alarm transducer 80 on front panel 25. The visual indication on the panel will remind the attendant that the continuous signal indicates hydrocarbon or a failed inner tank and the intermittent signal indicates water or a failed outer tank. Thus immediate action responsive to the particular problem at hand may be taken.

A novel fluid detector which is simple and inexpensive to manufacture and which can be utilized effectively with both probes external to storage tanks and probes between the walls of double-walled storage tanks has been described.

It is evident that those skilled in the art may now make many uses and modifications of the specific embodiments described without departing from the inventive concepts. For example, other first and second alarms may be used, provided they are different, and the first outline 90 may entirely encircle transducer 80 while the second outline 91 may be superimposed on the outline 90 about the transducer in a dotted pattern. Other such designs may be used or equivalent electronic parts may be used. Consequently, the invention is to be construed as embracing each and every novel feature and novel combinations of features present in the fluid detector described.

What is claimed is:

1. In a fluid detector of the type comprising a plurality of probe means for sensing their fluid environment and for providing a hydrocarbon signal indicative of the presence of hydrocarbon in the probe environment, a water signal indicative of the presence of water in the probe environment, and a dry signal indicative that the probe environment is dry, and a controller means responsive to said signals from said probe means for providing an alarm, the improvement wherein said controller means includes:

a means for selecting between a first alarm mode in which said alarm is provided only in response to a hydrocarbon signal from one or more of said probes and a second alarm mode in which said alarm is provided both in response to a hydrocarbon signal from one or more of said probes and also to a water signal from one or more of said probes; and means for providing a first audible alarm in response to said hydrocarbon signal and a second audible alarm in response to said water signal.

2. A fluid detector as in claim 1 wherein said controller includes an audible alarm transducer and a control panel, and said transducer is mounted on said control panel, and further including a visual means for visually indicating that said first audible alarm indicates hydrocarbons and said second audible alarm indicates water.

3. A fluid detector as in claim 2 wherein said visual means comprises a first label and a first outline in a first color, the first label visually linking said first label and said transducer, and a second label and a second outline in a second color, said second outline visually linking said second label and said transducer.

4. A fluid detector as in claim 3 wherein said first outline and said second outline at least partially encircle said transducer and said first outline encloses a larger portion of the transducer than said second outline.

5. A fluid detector as in claim 3 wherein said first color is red and said second color is yellow.

6. A fluid detector as in claim 3 wherein said first audible signal is a continuous tone and said second audible signal is an intermittent tone.

* * * * *

UNITED STATES PATENT AND TRADEMARK OFFICE
CERTIFICATE OF CORRECTION

PATENT NO. : 4,721,950

DATED : January 26, 1988

INVENTOR(S) : Raymond J. Andrejasich et al

It is certified that error appears in the above-identified patent and that said Letters Patent is hereby corrected as shown below:

On the title page Item (75) inventor "Roy F. Kidd" should read -- Roy E. Kidd --.

Signed and Sealed this

Nineteenth Day of July, 1988

Attest:

DONALD J. QUIGG

*Attesting Officer*    *Commissioner of Patents and Trademarks*